United States Patent
Ballard et al.

(10) Patent No.: US 7,896,952 B2
(45) Date of Patent: Mar. 1, 2011

(54) CARTRIDGE ADSORBER SYSTEM FOR REMOVING HYDROGEN SULFIDE FROM REFORMATE

(75) Inventors: Gary L. Ballard, Victor, NY (US); Gail E. Geiger, Caledonia, NY (US); Curtis D. Lamb, Scottsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 284 days.

(21) Appl. No.: 12/082,779

(22) Filed: Apr. 14, 2008

(65) Prior Publication Data

US 2009/0258264 A1    Oct. 15, 2009

(51) Int. Cl.
B01D 53/04  (2006.01)
H01M 8/06  (2006.01)

(52) U.S. Cl. .................. 95/136; 96/147; 96/151; 429/19

(58) Field of Classification Search ............. 96/147, 96/151; 95/136; 423/230; 429/19
See application file for complete search history.

(56) References Cited

U.S. PATENT DOCUMENTS

| | | | | |
|---|---|---|---|---|
| 4,455,286 | A * | 6/1984 | Young et al. | 423/230 |
| 5,288,306 | A * | 2/1994 | Aibe et al. | 95/141 |
| 5,595,949 | A * | 1/1997 | Goldstein et al. | 502/20 |
| 5,645,720 | A | 7/1997 | Godines | |
| 6,277,178 | B1 * | 8/2001 | Holmquist-Brown et al. | 96/135 |
| 6,533,847 | B2 * | 3/2003 | Seguin et al. | 96/129 |
| 6,689,194 | B2 * | 2/2004 | Pratt et al. | 95/139 |
| 7,306,641 | B2 * | 12/2007 | Arthur et al. | 55/385.1 |
| 7,419,060 | B2 * | 9/2008 | Arthur et al. | 210/429 |
| 7,449,046 | B2 * | 11/2008 | Schroeter | 95/21 |
| 2002/0178915 | A1 * | 12/2002 | Shore et al. | 95/136 |
| 2004/0091753 | A1 | 5/2004 | Terorde et al. | |
| 2005/0121365 | A1 * | 6/2005 | Weston et al. | 208/226 |
| 2008/0210090 | A1 * | 9/2008 | Zuberi | 95/90 |
| 2008/0367848 | | 10/2008 | Stephanopoulos et al. | |
| 2008/0292923 | A1 * | 11/2008 | Ballard et al. | 429/19 |

FOREIGN PATENT DOCUMENTS

| | | |
|---|---|---|
| EP | 0 604 320 | 6/1994 |
| EP | 1 048 541 | 11/2000 |
| EP | 1 236 495 | 9/2002 |
| EP | 1 997 550 | 12/2008 |
| WO | 2006/052997 | 5/2006 |

OTHER PUBLICATIONS

European Search Report dated Sep. 20, 2010.

* cited by examiner

*Primary Examiner* — Frank M Lawrence
(74) *Attorney, Agent, or Firm* — Jimmy L. Funke

(57) ABSTRACT

A system for removal of $H_2S$ from sulfur-containing reformate comprising a permanent canister assembly having fittings for flow of reformate therethrough and a replaceable cartridge assembly containing an $H_2S$ adsorber element and fittings for convenient, simple, and reliable mating and sealing with the permanent canister assembly. The cartridge assembly comprises a housing that may be optionally a full cylinder or a semi-cylinder. The cartridge assembly may be easily reloaded off-line for re-use of the cartridge components with a fresh adsorber element. Preferably, the adsorber element is also renewable off-line for re-use.

17 Claims, 4 Drawing Sheets

CARTRIDGE ADSORBER SYSTEM FOR REMOVING HYDROGEN SULFIDE FROM REFORMATE

RELATIONSHIP TO GOVERNMENT CONTRACTS

The present invention was supported in part by a U.S. Government Contract, No. DE-FC36-04G014319. The United States Government may have rights in the present invention.

TECHNICAL FIELD

The present invention relates to a mechanism for selective gas adsorption; more particularly, to a mechanism for selectively removing hydrogen sulfide ($H_2S$) from a stream of mixed gases; and most particularly, to a convenient replaceable cartridge system for removing $H_2S$ from reformate generated by a hydrocarbon reformer.

BACKGROUND OF THE INVENTION

In the fuel cell arts of hydrogen-oxygen fuel cells, it is known to provide gaseous hydrogen-containing fuel to a fuel cell stack by reforming hydrocarbon materials; for example, gasoline, diesel fuel, natural gas, or methane. A device for producing such hydrogen-containing fuel is known as a "reformer", and the fuel itself is known in the arts as "reformate".

Naturally occurring hydrocarbon starting materials typically contain small amounts of sulfur which can be present as $H_2S$ in reformate. A fuel cell stack such as a solid oxide fuel cell stack contains elements that are disabled, or "poisoned", by small amounts of $H_2S$ in the reformate. Such a fuel cell stack suffers loss of power if the reformate fuel stream contains more than about 10 parts per billion (ppb) of sulfur; however, typical hydrocarbon sources can contain up to 2 parts per million (ppm) of sulfur, i.e., 200 times the desirable upper limit. Thus, from a practical standpoint, it is necessary to provide a device in the reformate stream between the reformer and the fuel cell stack to selectively remove a high percentage of the $H_2S$ from the reformate stream.

Efficient selective $H_2S$ adsorbers are known in the art, for example, nickel/alumina/rare earth compositions. Such materials can be highly efficient but have finite capacity and therefore must be regenerated or replaced periodically during operation of a fuel cell system. Removal and replacement of the adsorber material is the preferred procedure rather than in situ renewal. Such removal and replacement can be cumbersome. Moreover, since the adsorber operates in a hot zone environment where temperatures can exceed 750° C., a cooldown period is needed to return the temperature of the adsorber below a temperature suitable for handling of the adsorber, before removal and replacement of the adsorber can be completed, making such an exchange time-consuming.

What is needed in the art is an improved system for removal of $H_2S$ from a reformate stream requiring a minimum number of replacement parts and minimum operator training, and causing minimal fuel cell system downtime for replacement of an $H_2S$ adsorber.

It is a principal object of the present invention to simplify removal and replacement of an $H_2S$ adsorber in the hot zone of a fuel cell system.

SUMMARY OF THE INVENTION

Briefly described, a system for removal of $H_2S$ from sulfur-containing reformate comprises a permanent canister assembly located in a hot zone within the fuel cell unit having fittings for flow of reformate therethrough and a replaceable cartridge assembly containing an $H_2S$ adsorber element and fittings for convenient, simple, and reliable mating and sealing with the permanent canister assembly. In one aspect of the invention, the cartridge assembly is readily accessible for servicing through a removable plate located on an outside wall of the housing of the fuel cell unit. The cartridge assembly comprises a housing that may be optionally a full cylinder or a semi-cylinder. After its removal from the hot zone through the access plate, a fresh replacement cartridge may be re-installed immediately thereby significantly reducing fuel cell down-time. The removed cartridge assembly may be readily reloaded off-line for re-use of the cartridge components with a fresh adsorber element. The replenishable adsorber element may be of any form including, for example: powder; coated pellets; or a porous monolith element.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
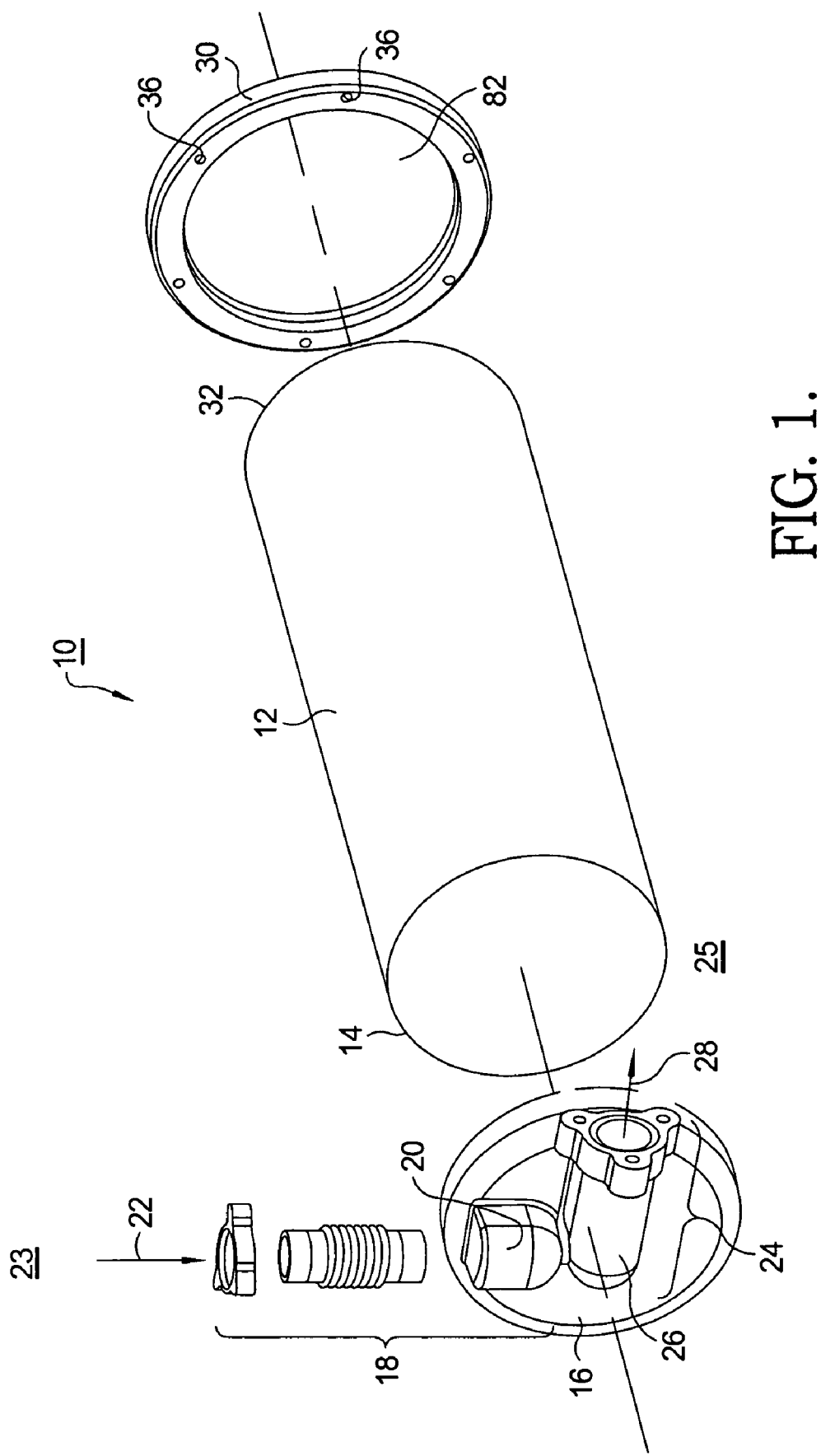
FIG. 1 is an exploded isometric view of a permanent canister assembly.

Referring to FIG. 1, an exemplary canister assembly 10 in accordance with the present invention comprises a cylindrical canister housing 12 coupled as by welding at a first end 14 to a first end cap 16. An entry fitting assembly 18 includes a first fitting 20 for entry of sulfur-containing reformate 22 into an entry port in first end cap 16. An exit fitting assembly 24 includes a second fitting 26 for exiting of reduced-sulfur reformate 28 from an exit port in first end cap 16. A connector member such as, for example, connecting ring 30, is attached as by welding to a second end 32 of housing 12. Canister assembly 10 is fixedly mounted within a hot zone of an associated fuel cell unit with second end 32 proximate an outside wall of the unit as will be later described with reference to FIG. 3. Referring again to FIG. 1, connecting ring 30 comprises means for matably and sealably receiving a replaceable adsorption cartridge assembly 74, 74', exemplarily shown in FIGS. 2 and 4, into permanent canister 10. Such mating and sealing means may include, but is not limited to, ring seal 35, threaded bores 36 and bolts 38 (FIG. 2), circumferential threadings (not shown), or any other means without limit that can be readily disassembled and can reliably seal a replacement adsorption cartridge assembly into canister assembly 10.

Figure 2:
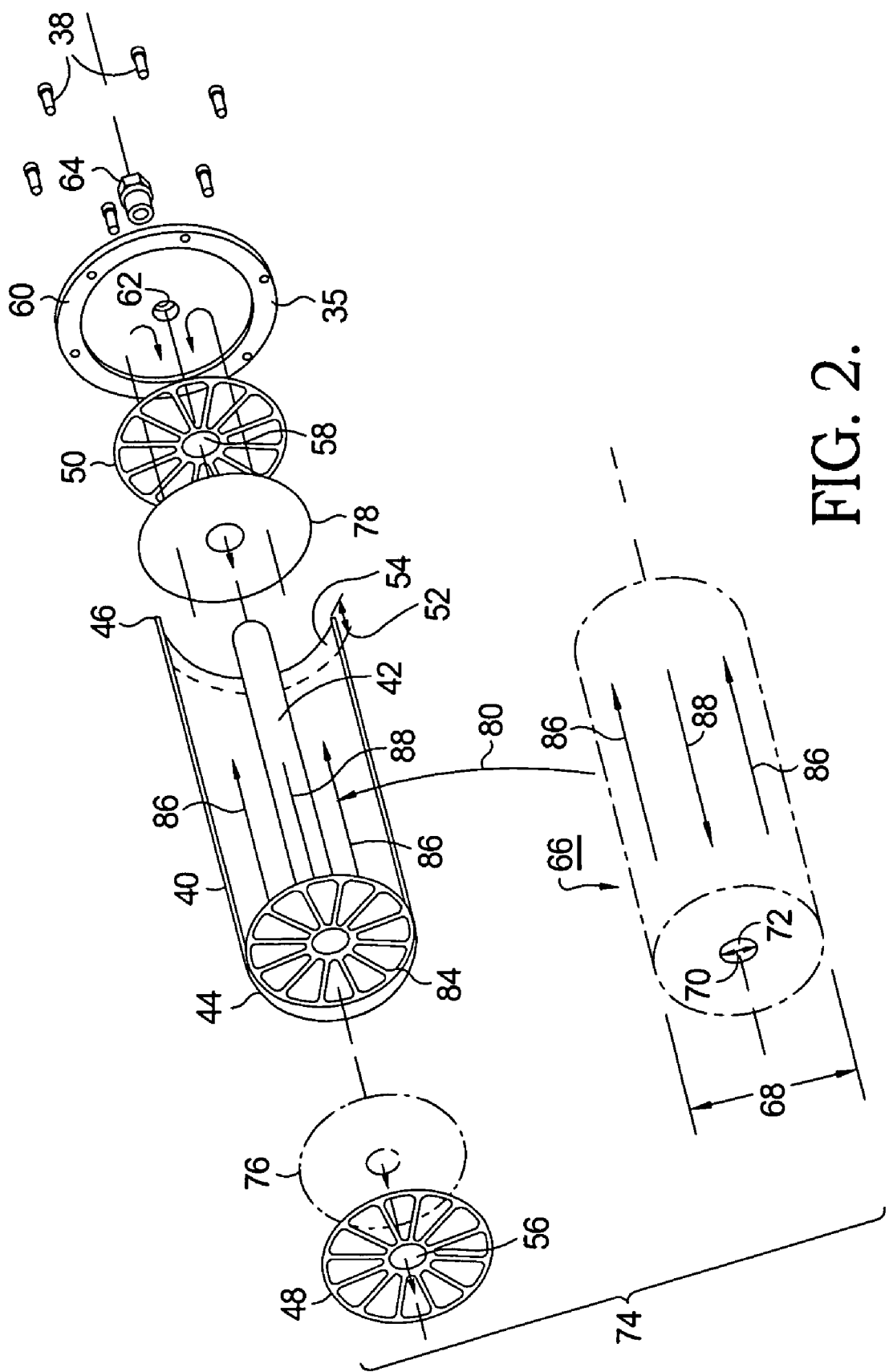
FIG. 2 is an exploded isometric view of a replaceable $H_2S$ cartridge assembly of a first embodiment for use with the permanent canister assembly shown in FIG. 1 in accordance with the present invention.

Referring now to FIG. 2, an exemplary adsorption cartridge assembly 74 in accordance with one aspect of the present invention comprises a cylindrical cartridge housing 40 for receiving an axial return tube 42 supported at first and second housing ends 44,46 by first and second "spiders" 48,50, so known colloquially in the art because of their resemblance to webs of orb spiders. Preferably, second spider 50 is disposed and preferably is welded at a short distance 52 from second end 46 to create a headspace 54 within housing 40. Return tube 42 is slidably received in first and second central apertures 56,58 in spiders 48,50, respectively. A second end cap 60 is sealingly attached as by welding to second housing end 46 to complete headspace 54 and preferably is provided with an opening 62 and fitting 64 to permit purging of air from the system during startup. Fitting 64 is closed during normal operation.

The cartridge components thus far described are entirely re-usable.

In one aspect of the invention, for use in housing 40, an $H_2S$ adsorption element 66 is formed as a cylindrical porous monolith having either open cells or longitudinal channels (neither shown) for longitudinal passage of reformate and selective adsorption of $H_2S$ in known fashion. The outer diameter 68 of element 66 selected to be close-fitting within housing 40, and the inner diameter 70 of axial passage 72 is selected to be close-fitting around return tube 42.

Referring now to FIGS. 1 and 2, in a first embodiment of a cartridge assembly 74 in accordance with the present invention, to replace a loaded element, element 66 is inserted into cartridge housing 40 via open end 44. Return tube 42 is inserted into element passage 72 and thence into spider aperture 58. Alternatively, return tube 42 is permanently attached to second spider 50 and element 66 is installed into housing 40 directly over return tube 42. First spider 48 is installed into housing 40 against element 66 and onto return tube 42 and fixed in place, for example, by welding. If desired or necessary, first and/or second screens 76,78 may be installed adjacent spiders 48,50.

Alternately, cartridge housing 40 is formed as a semicylinder, as shown in FIG. 2, permitting element 66 to be inserted radially 80 into housing 40, absent return tube 42. The return tube and first spider are then installed as described above.

The removal of element 66 from the cartridge assembly is the reverse of assembly for either of the housing embodiments.

Figure 3:
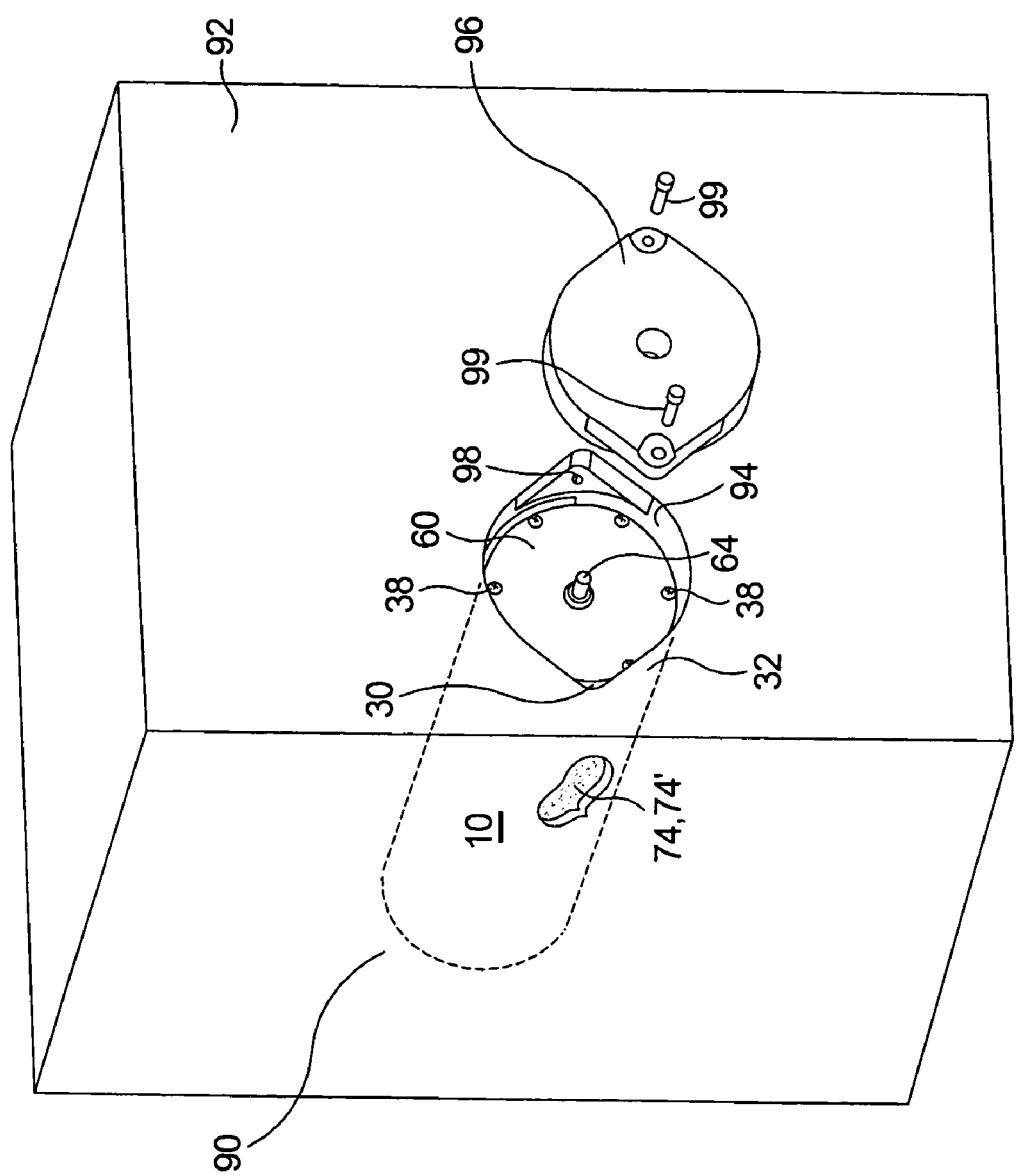
FIG. 3 is an isometric view of an exemplary fuel cell hot zone with the accessible replacement cartridge assembly shown, in accordance with the invention.

Referring to FIG. 3, canister assembly 10 is fixedly mounted within hot zone 90 of an associated fuel cell unit with second end 32 proximate an outside wall 92 of the unit. Outside wall 92 defines access opening 94 which is sized to permit removal and inserting of cartridge assembly through its opening. Mating cover plate 96 and seal (not shown) fit over access opening to seal the opening during normal operation of the fuel cell unit. Threaded bores 98 and bolts 99, or any other means without limit, may be used to secure the seal and cover plate over the access opening.

For use, when cartridge assembly is ready for replacement, without the need for a lengthy cool-down step to allow the adsorber's temperature to reduce to a temperature substantially below its operating temperature, cover plate 96 may be first removed from outside wall 92 to access end cap 60. Bolts 38 are then removed permitting end cap 60 of the cartridge assembly to be separated from canister assembly ring 30. Loaded cartridge assembly 74 may then be removed through access opening 94 to be recharged, off-line. In reverse order, a fresh cartridge assembly 74 may then be inserted into canister assembly 10 via access opening 94 in outside wall 92, and opening 82 in ring 36. Second end cap 60 may be then be sealingly secured to ring 30 as described above. Note that an end 84 of return tube 42 protrudes from first spider 48 for engaging (not visible in FIG. 1) exit fitting 26. Thus, in accordance with the invention, a cool-down period in which the temperature of the adsorber drops substantially below its operating temperature before the adsorber is removed is not necessary.

In operation of an $H_2S$ removal system in accordance with the present invention, sulfur-containing reformate 22 from a catalytic hydrocarbon reformer 23 enters entry fitting assembly 18 and is directed to flow longitudinally in a first direction 86 through element 66 wherein $H_2S$ is selectively adsorbed onto element 66 and removed from reformate 22, resulting in reduced-sulfur reformate 28 in headspace 54. Reduced-sulfur reformate 28 flows from headspace 54 longitudinally in a second and opposite direction 88 through return tube 42 and exits the system via exit fitting assembly 24 for use in a fuel cell system 25 (not shown).

Figure 4:
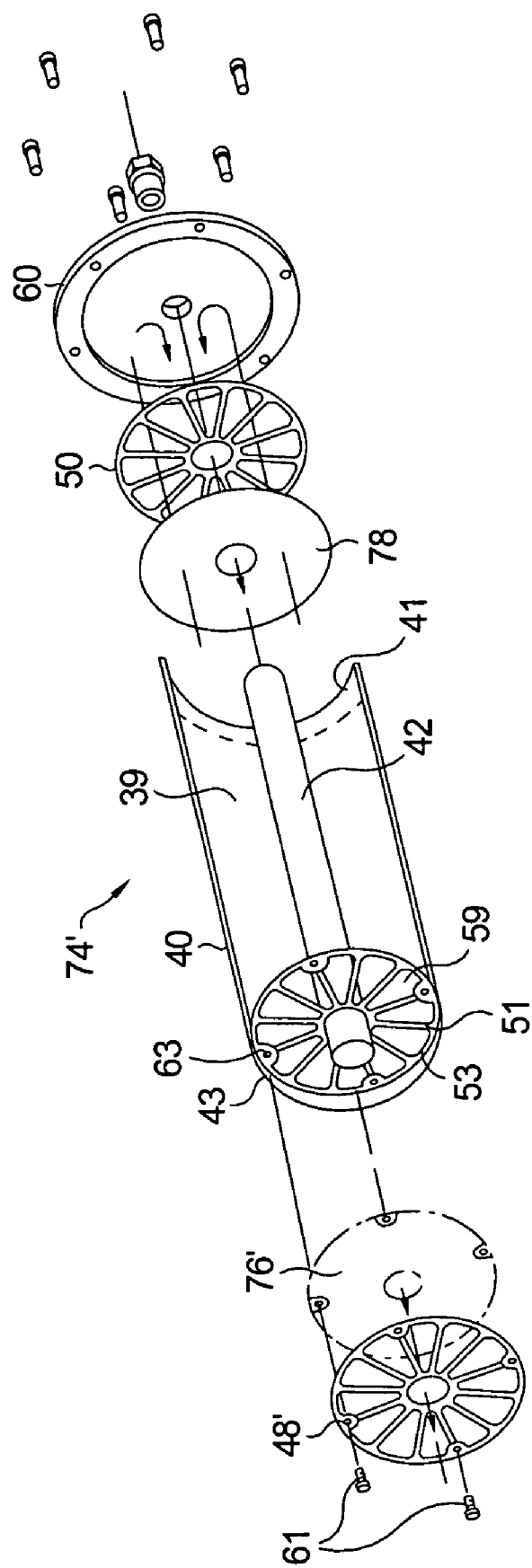
FIG. 4 is an exploded isometric view of a replaceable $H_2S$ cartridge assembly of a second embodiment for use with the permanent canister assembly shown in FIG. 1 in accordance with the present invention.

Referring now to FIG. 4, in accordance with another aspect of the present invention, an exemplary adsorption cartridge assembly 74' in which adsorber material in the form of powder or coated pellets is used, is shown. In this embodiment, an enclosure is formed for receiving and containing the powder or pellets using many of the components of embodiment 74 for receiving a monolith element, including cartridge housing 40, end cap 60, spider 50, screen 78 and return tube 42. Housing 40 may be formed of a full cylinder or from two semi-cylinders as described above. The components may be assembled together in any convenient order, such as by welding, to form a cup-like enclosure for receiving adsorbent pellets or powder, the enclosure being bounded on three sides by housing 40, tube 42 and, at a first end 41, screen 78 supported by spider 50. At a second end 43, distal from the first end, third spider 51 is fixed in place, as example by welding, to provide a gapped recess 53 between third spider 51 and edge 55 of housing 40. Thus, enclosure 57 is formed for receiving adsorbent pellets or powder. Adsorbent pellets or powder may then be loaded into enclosure space 39 through openings 59 in third spider 51. Once the cartridge assembly 74' is loaded in this manner, screen 76' may be secured by first spider 48' in recess 53 to contain the pellets/powder using, for example, screws 61, fitted into threaded bores 63 in third spider 51. Cartridge assembly 74', like cartridge assembly 74, is entirely re-usable.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for removal of sulfur from sulfur-containing reformate to produce a reduced-sulfur reformate, comprising:
   a) a canister assembly for connection to a source of said sulfur-containing reformate and to a user of said reduced-sulfur reformate; and
   b) a replaceable cartridge assembly removably disposed within said canister assembly for receiving said sulfur-containing reformate from said canister assembly, removing at least a portion of sulfur from said sulfur containing reformate to produce said reduced-sulfur reformate, and conveying said reduced-sulfur reformate to said canister assembly;

wherein said canister assembly comprises:
a) a cylindrical canister housing;
b) a first end cap attached to a first end of said canister housing;
c) a first port in said first end cap for entry of said sulfur-containing reformate into said canister housing;
d) a second port in said first end cap for exit of said reduced-sulfur reformate from said canister assembly; and
e) a connector member attached to a second end of said cylindrical canister housing.

2. A system in accordance with claim 1 wherein said replaceable cartridge assembly further comprises a second end cap attached to an end of said cartridge housing.

3. A system in accordance with claim 2 wherein said replaceable cartridge assembly further comprises a cartridge housing and first and second spiders for spaced-apart installation into said cartridge housing, said spider adjacent said second end cap being spaced from said second end cap to create a headspace within said cartridge housing.

4. A system in accordance with claim 3 wherein said replaceable cartridge assembly further comprises a central return tube disposed in respective central apertures in said first and second spiders and wherein is removably mounted on said central return tube within said cartridge housing and between said first and second spiders.

5. A system in accordance with claim 2 wherein said second end cap includes a surface for mating and sealing to said connector member when said cartridge assembly is installed into said canister assembly.

6. A system in accordance with claim 3 wherein said cartridge assembly further comprises at least one screen disposed between an end of said element and one of said first and second spiders.

7. A system in accordance with claim 2 wherein said cartridge assembly further comprises a port in said second end cap for purging said system as desired.

8. A system for removal of sulfur from sulfur-containing reformate to produce a reduced-sulfur reformate, comprising:
a) a canister assembly for connection to a source of said sulfur-containing reformate and to a user of said reduced-sulfur reformate; and
b) a replaceable cartridge assembly removably disposed within said canister assembly for receiving said sulfur-containing reformate from said canister assembly, removing at least a portion of sulfur from said sulfur containing reformate to produce said reduced-sulfur reformate, and conveying said reduced-sulfur reformate to said canister assembly;

wherein said replaceable cartridge assembly comprises:
a) a cartridge housing; and
b) an element formed of material formulated for selective removal of sulfur from reformate, said element being removably mounted within said cartridge housing;
wherein said element includes nickel and alumina;
wherein said element further includes a rare earth.

9. A fuel cell system including a source for producing sulfur-containing hydrocarbon reformate, said system comprising:
a) a hot zone containing at least one fuel cell stack fueled by reduced-sulfur reformate; and
b) a sub-system disposed in a flow stream of said sulfur-containing hydrocarbon reformate between said source of said sulfur-containing hydrocarbon reformate and said fuel cell stack for selective removal of sulfur from said sulfur-containing hydrocarbon reformate to produce said reduced-sulfur reformate, wherein said sub-system includes a replaceable cartridge assembly disposed within said hot zone for receiving said sulfur-containing reformate, removing at least a portion of said sulfur from said sulfur-containing reformate to produce said reduced-sulfur reformate, and conveying said reduced-sulfur reformate to said fuel cell stack.

10. A fuel cell system in accordance with claim 9 further including a canister assembly disposed in said hot zone wherein said replacement cartridge assembly is removable from said canister assembly.

11. A fuel cell system in accordance with claim 9 wherein said hot zone includes an outer wall defining an access opening and wherein said replaceable cartridge assembly is accessible through said access opening for removal of the cartridge assembly from said hot zone.

12. A method of servicing a sulfur adsorber element in a fuel cell assembly wherein the adsorber element is disposed within a hot zone of said fuel cell, the method comprising the steps of:
a) accessing the adsorber element through an opening provided in outer wall of said hot zone;
b) removing the adsorber element from said hot zone through said opening.

13. A method of servicing a sulfur adsorber element in accordance with claim 12 wherein a temperature within said hot zone is above ambient temperature.

14. A method of servicing a sulfur adsorber element in accordance with claim 12 wherein said adsorber element is part of a cartridge assembly and said cartridge assembly is removed from said hot zone through said opening.

15. A method of servicing a sulfur adsorber element in accordance with claim 14 wherein a canister assembly is disposed in said hot zone for receiving the cartridge assembly.

16. A method of servicing a sulfur adsorber in accordance with claim 12 comprising a further step of replacing said removed adsorber element with a second adsorber element.

17. A method of servicing a sulfur adsorber in accordance with claim 16 wherein said second adsorber element is not the removed adsorber element.

* * * * *